US007759897B2

(12) United States Patent
Piippo

(10) Patent No.: US 7,759,897 B2
(45) Date of Patent: Jul. 20, 2010

(54) METHOD FOR SENSORLESS ESTIMATION OF ROTOR SPEED AND POSITION OF A PERMANENT MAGNET SYNCHRONOUS MACHINE

(75) Inventor: Antti Piippo, Espoo (FI)

(73) Assignee: ABB Oy, Helsinki (FI)

( * ) Notice: Subject to any disclaimer, the term of this patent is extended or adjusted under 35 U.S.C. 154(b) by 371 days.

(21) Appl. No.: 11/972,667

(22) Filed: Jan. 11, 2008

(65) Prior Publication Data

US 2008/0169782 A1    Jul. 17, 2008

(30) Foreign Application Priority Data

Jan. 12, 2007    (EP)    ................... 07100472

(51) Int. Cl.
*H02P 1/46* (2006.01)
(52) U.S. Cl. ............... 318/700; 318/721; 318/727; 318/779; 318/799; 318/807
(58) Field of Classification Search ........ 318/700, 318/701, 721, 727, 779, 799, 801, 807, 808, 318/811, 812
See application file for complete search history.

(56) References Cited

U.S. PATENT DOCUMENTS

| | | | | |
|---|---|---|---|---|
| 6,163,127 | A * | 12/2000 | Patel et al. | ............ 318/700 |
| 6,763,622 | B2 * | 7/2004 | Schulz et al. | ........... 318/700 |
| 7,015,664 | B2 * | 3/2006 | Coles et al. | ......... 318/400.01 |
| 7,088,077 | B2 * | 8/2006 | Nagashima et al. | ........ 322/37 |
| 7,098,623 | B2 * | 8/2006 | Piippo | ................. 318/721 |
| 7,221,152 | B2 * | 5/2007 | Piippo | ............... 324/207.25 |

FOREIGN PATENT DOCUMENTS

EP    1 553 692    7/2005

OTHER PUBLICATIONS

Blaabjerg et al., "Single Current Sensor Technique in the DC Link of Three-Phase PWM-VS Inverters: A Review and a Novel Solution" IEEE Transactions on Industry Applications, 1997, vol. 33, No. 5, pp. 1241-1253.

(Continued)

*Primary Examiner*—Bentsu Ro
*Assistant Examiner*—Antony M Paul
(74) *Attorney, Agent, or Firm*—Buchanan, Ingersoll & Rooney PC

(57) ABSTRACT

A method for sensorless estimation of rotor speed and position of a permanent magnet synchronous machine, when the permanent magnet synchronous machine is fed with a frequency converter, the method comprising the steps of forming a stator voltage reference for the permanent magnet synchronous machine, injecting a high frequency signal ($u_c$) into the stator voltage reference, measuring a DC-link current ($i_{dc}$) of the frequency converter when the permanent magnet synchronous machine (4) is fed with a voltage ($u_{s,ref}$) corresponding to a sum of the stator voltage reference and the injected signal, calculating a stator current estimate ($\hat{i}_s$), calculating a current error ($\tilde{i}_s$) as a difference between the stator current estimate and the measured DC-link current, and estimating a rotor speed ($\hat{\omega}_m$) and position ($\hat{\theta}_m$) of the permanent synchronous machine based on the current error. The injected high frequency signal ($u_c$) comprises a direct axis component and a quadrature axis component, the direct axis component having a first frequency and the quadrature axis component having a second frequency, the first and second frequencies being different.

6 Claims, 2 Drawing Sheets

OTHER PUBLICATIONS

Depenbrock, "Pulse Width Control of a 3-Phase Inverter with Non-Sinusoidal Phase Voltages" IEEE ISPC'77, 1977, pp. 399-403.

Frenzke et al., "Position-Sensorless Control of Direct Drive Permanent Magnet Synchronous Motors for Railway Traction" 35th Annual IEEE Power Electronics Specialists Conference, 2004, pp. 1372-1377, Aachen Germany.

Green et al., "Derivation of Motor Line-Current Waveforms From the DC-Link Current of an Inverter" IEEE Proceedings, 1989, vol. 136, Pt. B, No. 4, pp. 196-204.

Habetler et al., "Control Strategies for Direct Torque Control Using Discrete Pulse Modulation" IEEE Transactions on Industry Applications, 1991, vol. 27, No. 5, pp. 893-901.

Kim et al., "Phase Current Reconstruction for AC Motor Drives Using a DC Link Single Current Sensor and Measurement Voltage Vectors" IEEE Transactions on Power Electronics, 2006, vol. 21, No. 5, pp. 1413-1419.

Kolar et al., "Influence of the Modulation Method on the Conduction and Switching Losses of a PWM Converter System" IEEE Transactions on Industry Applications, 1991, vol. 27, No. 6, pp. 1063-1075.

Moynihan et al., "Single Sensor Current Control of AC Servodrives Using Digital Signal Processors" EPE'93, 1993, vol. 4, pp. 415-421, Brighton, UK.

Ogasawara et al., "A Novel PWM Scheme of Voltage Source Inverters Based on Space Vector Theory" EPE, 1989, vol. 1, pp. 1197-1202, Aachen Germany.

Piippo et al., "Analysis of an Adaptive Observer for Sensorless Control of PMSM Drives" IEEE IECON, 2005, pp. 1474-1479, Raleigh, NC.

Piippo et al., "Adaptive Observer Combined with HF Signal Injection for Sensorless Control of PMSM Drives" Electric Machines and Drives, IEEE International Conference, 2005, pp. 674-681, Piscataway, NJ.

Rieder et al., "Sensorless Control of an External Rotor PMSM in the Whole Speed Range Including Standstill Using DC-Link Measurements Only" 35th Annual IEEE Power Electronics Specialists Conference, 2004, pp. 1280-1285, Aachen Germany.

Vukosavic et al., "Sensorless Induction Motor Drive with a Single DC-Link Current Sensor and Instantaneous Active and Reactive Power Feedback" IEEE Transactions on Industrial Electronics, 2001, vol. 48, No. 1, pp. 195-204.

European Search Report Application/Patent No. 07100472.5-2207 dated Jul. 4, 2007.

* cited by examiner

METHOD FOR SENSORLESS ESTIMATION OF ROTOR SPEED AND POSITION OF A PERMANENT MAGNET SYNCHRONOUS MACHINE

FIELD OF THE INVENTION

The present invention relates to sensorless control of permanent magnet synchronous machines (PMSM), and more particularly to control of PMSMs with DC-current measurement.

BACKGROUND OF THE INVENTION

Vector control of AC motors requires feedback from phase currents of a motor. Usually, these currents are obtained by measuring at least two of the phase currents. The currents have to be measured by devices that are electrically isolated from control electronics. Hall-effect sensors, which are commonly used for this purpose, are expensive components in low-cost frequency converters. In addition, deviations in the gains between current sensors of different phases may cause current ripple and, consequently, torque ripple. A cost-effective alternative to the phase current measurement is to measure the DC-link current of a frequency converter as in [1] T. C. Green and B. W. Williams, "Derivation of motor line-current waveforms from the DC-link current of an inverter," Proc. Inst. Elect. Eng. B, vol. 136, no. 4, pp. 196-204, July 1989. The phase currents of the motor can be estimated using the DC-link current and information on the states of inverter switches.

Previously, several methods have been proposed for the estimation of phase currents. The phase currents can be sampled during the active voltage vectors of a direct torque controlled drive as disclosed in [2] T. Habetler and D. M. Divan, "Control strategies for direct torque control using discrete pulse modulation," IEEE Trans. Ind. Applicat., vol. 27, no. 5, pp. 893-901, September/October 1991.

A dynamic model of a permanent magnet synchronous motor (PMSM) is used to predict the stator current, and the phase currents are updated from the available current samples during a single three-phase pulse width modulation (PWM) cycle in [3] J. F. Moynihan, S. Bolognani, R. C. Kavanagh, M. G. Egan, and J. M. D. Murphy, "Single sensor current control of ac servodrives using digital signal processors," in Proc. EPE'93, vol. 4, Brighton, UK, September 1993, pp. 415-421. Three-phase PWM can be used and multiple samples can be taken in one switching period to obtain the phase currents as disclosed in [4] F. Blaabjerg, J. K. Pedersen, U. Jaeger, and P. Thoegersen, "Single current sensor technique in the DC link of three-phase PWM-VS inverters: a review and a novel solution," IEEE Trans. Ind. Applicat., vol. 33, no. 5, pp. 1241-1253, September/October 1997.

Stator current information is obtained using a model for active and reactive power balance in [5] S. N. Vukosavic and A. M. Stankovic, "Sensorless induction motor drive with a single DC-link current sensor and instantaneous active and reactive power feedback," IEEE Trans. Ind. Electron., vol. 48, no. 1, pp. 195-204, February 2001. A motion-sensorless scheme using a fundamental-excitation method with space-vector PWM at high speeds and an INFORM method with discrete active voltage vectors at low speeds is proposed in [6] U.-H. Rieder, M. Schroedl, and A. Ebner, "Sensorless control of an external rotor PMSM in the whole speed range including standstill using DC-link measurements only," in Proc. IEEE PESC'04, vol. 2, Aachen, Germany, June 2004, pp. 1280-1285. Phase currents can also be sampled during the active voltage vectors applied in an additional excitation voltage sequence as disclosed [7] in H. Kim and T. M. Jahns, "Phase current reconstruction for AC motor drives using a DC link single current sensor and measurement voltage vectors," IEEE Trans. Pow. Electron., vol. 21, no. 5, pp. 1413-1419, September 2006.

Some of the previous methods require modification of the inverter switching pattern [2], [7], which results in voltage and current distortion and additional losses. Methods proposed in [3], [4], [6] employ three-phase voltage modulation, which requires a variable current sampling interval to detect the phase currents. Compared with a fixed sampling interval, faster A/D conversion and signal processor are needed. The benefit of rejecting the switching frequency and its subharmonics by the synchronized sampling is also lost with a variable sampling interval, and additional compensation algorithms have to be applied. The method proposed in [4] requires four current samples in each modulation period to reject the current ripple caused by the inverter.

Vector control of PMSM requires information on the stator currents of the machine. Costs relating to the current measurement are reduced when the current is measured from the DC-intermediate circuit of the inverter and state information on the inverter output switches are used to allocate the measured sample to the correct output phase. The stator current can then be reconstructed from these samples for control purposes.

If the PMSM is to be controlled in low rotational speeds, a signal injection method needs to be used. In signal injection, the machine is fed with a high frequency voltage signal. This injected voltage signal causes a current which can be detected and demodulated for correcting the position estimate of the rotor. One of the problems with the above is that the traditional signal injection does not necessarily give sufficient results in connection with DC-link current measurements. This is due to the fact that DC-current measurement gives samples from the output phase currents rather irregularly, which leads to a situation where the high-frequency current originating from the injected voltage cannot be reliably determined.

BRIEF DESCRIPTION OF THE INVENTION

An object of the present invention is thus to provide a method so as to solve the above problem. The object of the invention is achieved by a method which is characterized by what is stated in the independent claim. Preferred embodiments of the invention are disclosed in the dependent claims.

The invention is based on the idea of modifying the injected high-frequency voltage signal such that the position error information can be reliably determined from the measured DC-link current samples.

In the method of the invention, the stator current and rotor speed and position are estimated in a permanent magnet synchronous machine drive, in which the current is measured from the DC-link of the inverter. The stator current estimate is corrected with the obtained current samples and the rotor speed and position are estimated with an adaptive observer that is augmented with signal injection at low rotational speeds. In the invention, the adaptive observer is used to estimate the current in the injection frequency.

An advantage of the method and apparatus of the invention is that only one current sensor is required for sensorless control of a permanent magnet synchronous machine drive.

The method of the invention is described in connection with a two-phase (or discontinuous) PWM used for voltage modulation. This kind of modulation is disclosed for example in documents

[8] M. Depenbrock, "Pulse width control of a 3-phase inverter with nonsinusoidal phase voltages," in *Proc. IEEE ISPC'77*, 1977, pp. 399-403,

[9] S. Ogasawara, H. Akagi, and A. Nabae, "A novel PWM scheme of voltage source inverters based on space vector theory," in *Proc. EPE'89*, vol. 1, Aachen, Germany, October 1989, pp. 1197-1202, and

[10] J. W. Kolar, H. Ertl, and F. C. Zach, "Influence of the modulation method on the conduction and switching losses of a PWM converter system," *IEEE Trans. Ind. Applicat.*, vol. 27, no. 6, pp. 1063-1075, November/December 1991.

The invention is further described in connection with DC-current measurement, where the DC-link current is sampled at uniform intervals at the beginning and in the middle of the switching period as disclosed in [11] EP1553692.

An adaptive observer as disclosed in [12] A. Piippo, M. Hinkkanen, and J. Luomi, "Analysis of an adaptive observer for sensorless control of PMSM drives," in *Proc. IEEE IECON'05*, Raleigh, N.C., November 2005, pp. 1474-1479, is used for the rotor speed and position estimation, and for estimating the stator current. A modified high-frequency (HF) signal injection is used at low speeds to stabilize the estimation. The method of the invention enables stable operation in a wide speed range.

BRIEF DESCRIPTION OF THE DRAWINGS

In the following, the invention will be described in greater detail by means of preferred embodiments and with reference to the accompanying drawings, in which.

DETAILED DESCRIPTION OF THE INVENTION

1 Control System

Figure 1:
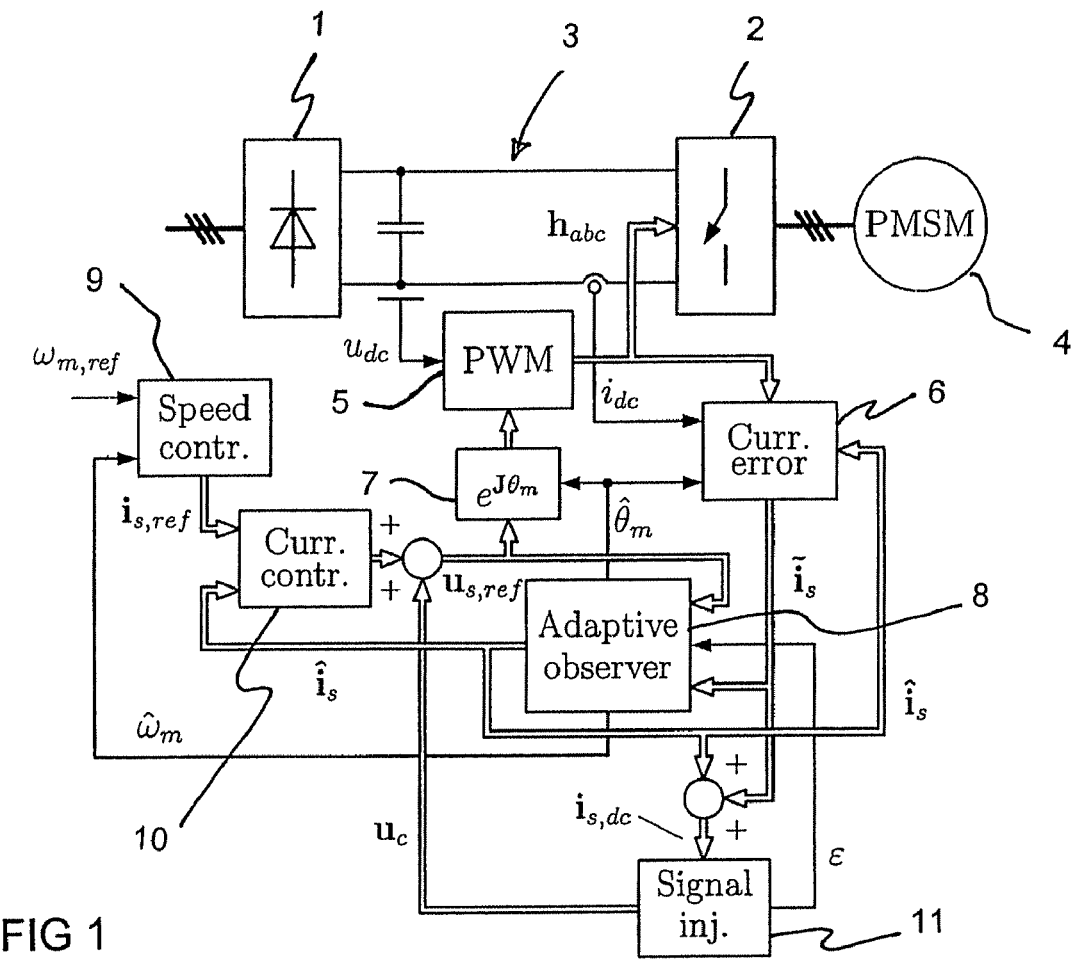
FIG. 1 shows a block diagram of a control system using the method of the invention.

A block diagram of a control system comprising cascaded speed and current control loops is shown in FIG. 1. A speed controller 9 receives an angular speed reference $\omega_{m,ref}$ and an estimated angular speed $\hat{\omega}_m$ as feedback. A current controller 10 receives a stator current reference $i_{s,ref}$ from the speed controller 9 and a stator current estimate $\hat{i}_s$ from an observer as feedback.

FIG. 1 also shows a basic structure of a frequency converter which consists of a rectifying bridge 1, a DC-intermediate circuit, i.e. a DC-link 3, and an inverter 2 feeding a PMSM 4. The only measured quantities needed for the control of PMSM are DC-link voltage $u_{dc}$ and DC-link current $i_{dc}$ at the input of the inverter 2. $\hat{\omega}_m$ and $\hat{\theta}_m$ are the estimates of the rotor electrical angular speed and position, respectively. A current error $\tilde{i}_s$ is calculated in block 6 using the estimated current $\hat{i}_s$, the DC-link current $i_{dc}$, and the references for inverter switching states $h_{abc}$ provided by a pulse width modulation (PWM) block 5. This current error is used for feedback in an adaptive observer 8 as will be described later. The PWM-block is also shown to receive the measured DC-link voltage $u_{dc}$.

2 PWM and Current Feedback

A three-phase voltage-source inverter has eight discrete switching states. Six inverter states produce a non-zero phase-to-phase voltage to the three-phase load 4 (the PMSM), and they are referred to as active inverter states. The two remaining states produce a zero output voltage. The DC-link current is non-zero only during active inverter states, and has to be sampled during an active state to obtain current information.

The DC-link current equals one phase current at a time, either $i_a$, $i_b$ or $i_c$, depending on the inverter switching states. The relation between the inverter switching states $h_{abc}=[h_a\ h_b\ h_c]$ and the phase current obtainable from the DC-link current $i_{dc}$ is given in Table 1. The switching state h of each phase is either 0 or 1, corresponding to the inverter output phase switched to the lower and the upper DC rail, respectively.

TABLE 1

| $h_a$ | $h_b$ | $h_c$ | $i_{dc}$ |
|---|---|---|---|
| 0 | 0 | 0 | — |
| 1 | 0 | 0 | $i_a$ |
| 1 | 1 | 0 | $-i_c$ |
| 0 | 1 | 0 | $i_b$ |
| 0 | 1 | 1 | $-i_a$ |
| 0 | 0 | 1 | $i_c$ |
| 1 | 0 | 1 | $-i_b$ |
| 1 | 1 | 1 | — |

2.1 Two-Phase PWM

Figure 3:
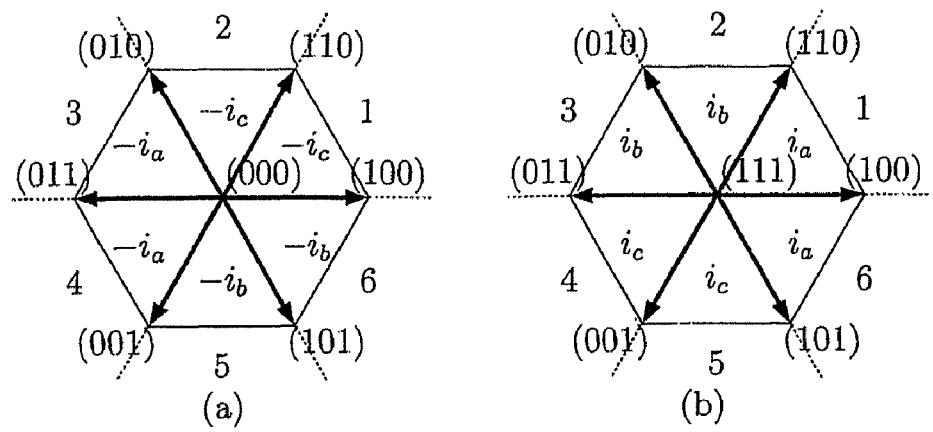
FIG. 3 shows phase currents corresponding to DC-link current for voltage references in different sectors of a stator reference frame.

Two-phase modulation [8] is selected as the pulse-width modulation method. The method defines the duration of the two active voltage vectors to be applied to a motor during one sampling period. The zero vector can be chosen arbitrarily without affecting the phase-to-phase voltage of the motor. In [10], the lower zero voltage vector (all phases in the negative DC rail) was used in odd sectors. On the contrary, the upper zero voltage vector (all phases in the positive DC rail) was used in odd sectors in [9]. Here, these two methods are alternated within a certain time period [11]. The sector numbers are defined in FIG. 3, which further shows phase currents corresponding to the DC-link current for a voltage reference in different sectors of the stator reference frame. FIG. 3(a) specifically shows phase currents obtained when the lower zero voltage vector (000) is used. Correspondingly, FIG. 3(b) relates to using the upper zero voltage vector (111). FIGS. 3(a) and 3(b) show which phase current the DC-link current equals when the voltage reference is known, depending on the zero vector used.

Figure 4:
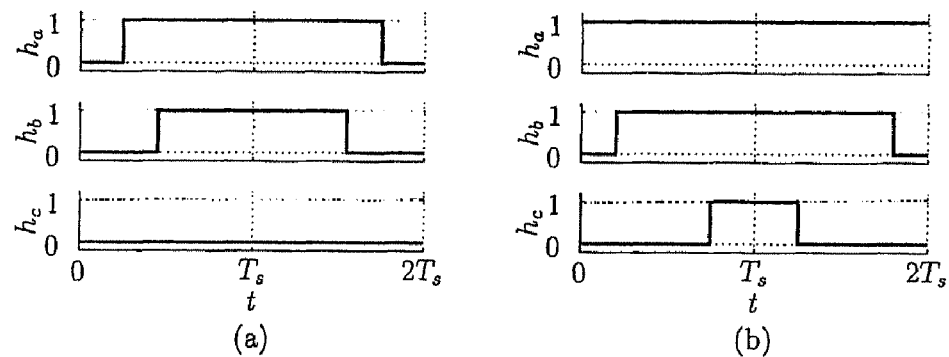
FIG. 4 shows switching states during one switching period using two-phase modulation.

The switching states for one switching period $2T_s$ are shown in FIG. 4, $T_s$ being the length of the sampling period. The results of two-phase vector modulation with the lower (FIG. 4(a)) and the upper (FIG. 4(b)) zero vectors are shown for the same voltage reference. Both methods produce the same average phase-to-phase voltage. With the lower zero voltage vector, the active voltage vectors are applied to the middle of the switching period, whereas with the upper zero voltage vector, the active voltage vectors are applied to the beginning and end of the period. In FIG. 4(a) in the middle of the switching period the voltage vector is (110). Since the zero voltage vector used is (000), the measured DC-link current at $T_s$ is $-i_c$, as can be seen in FIG. 3(a). In FIG. 4(b), sampling is carried out at the beginning of the switching period, since a zero vector is applied to the middle of the switching period. The zero voltage vector used is (111) and the measured DC-link current at the beginning of the switching period corresponds to phase current $i_a$ when the voltage vector is (100), as can be seen in FIG. 3(b).

Block 5 in FIG. 1 carries out the above modulation and thus produces the inverter switching states $h_{abc}$ according to which the output switches of the inverter are turned on and off. The same switching states are fed to block 6, which calculates the current error, as will be described below.

2.2 Current Feedback

The DC-link current is sampled at uniform intervals at the beginning and in the middle of the switching period, similarly as in [11]. One of the two current samples is obtained during an active voltage vector, and it thus corresponds to one phase current. By using the switching state references and the information given in Table 1, one phase current can be sampled. The phase current available in each voltage sector is shown in FIG. 3 for both lower and upper zero voltage vectors. An active voltage vector in FIG. 3 has a length of $\tfrac{2}{3}U_d$, $U_d$ being the DC-link voltage. In each sector, two phase currents can be sampled by changing the zero vector as explained above. The third phase current cannot be sampled until the voltage reference vector crosses a sector border.

The current feedback is based on the current estimation error $\tilde{i}_s$, which is obtained from block 6 in FIG. 1. The current error is updated using the phase current samples when current information is available, and kept constant if samples are not obtained. The current error is used as feedback in the observer 8 as presented below. The observer 8 also provides the estimated stator current $\hat{i}_s$ for current error calculation.

The current error is updated as follows. The estimated stator current $\hat{i}_s$ from the observer 8 and the current error $\tilde{i}_s$ from block 6 are transformed to phase quantities in the stationary reference frame, i.e.

$$\hat{i}_{abc} = T_{abc}\hat{i}_s \tag{1}$$

$$\tilde{i}_{abc} = T_{abc}\tilde{i}_s \tag{2}$$

where $$T_{abc} = \begin{bmatrix} \cos(\hat{\theta}_m) & \sin(\hat{\theta}_m) \\ \cos\left(\hat{\theta}_m - \frac{2\pi}{3}\right) & \sin\left(\hat{\theta}_m - \frac{2\pi}{3}\right) \\ \cos\left(\hat{\theta}_m + \frac{2\pi}{3}\right) & \sin\left(\hat{\theta}_m + \frac{2\pi}{3}\right) \end{bmatrix} \tag{3}$$

is the coordinate transformation matrix from the estimated rotor reference frame to the stationary reference frame, $\hat{\theta}$ being the estimated rotor position. The current error $\tilde{i}_{abc}=[\tilde{i}_a\,\tilde{i}_b\,\tilde{i}_c]^T$ in the stationary reference frame is updated if a phase current sample is available. If the current of phase a is available, the current estimation error is updated using $$\tilde{i}_a = i_a - \hat{i}_a \tag{4}$$

Instead, if the current of phase b or c is available, the current error of the corresponding phase is updated. After update, the current error is transformed back to the estimated rotor reference frame using $$\tilde{i}_s = T_{dq}\tilde{i}_{abc} \tag{5}$$

where $$T_{dq} = \frac{2}{3}\begin{bmatrix} \cos(-\hat{\theta}_m) & \cos\left(-\hat{\theta}_m + \frac{2\pi}{3}\right) & \cos\left(-\hat{\theta}_m - \frac{2\pi}{3}\right) \\ \sin(-\hat{\theta}_m) & \sin\left(-\hat{\theta}_m + \frac{2\pi}{3}\right) & \sin\left(-\hat{\theta}_m - \frac{2\pi}{3}\right) \end{bmatrix} \tag{6}$$

is the coordinate transformation matrix from the stationary reference frame to the estimated rotor reference frame. The operations above are executed during every sampling period, i.e. at intervals of $T_s$. With reference to the block diagram of FIG. 1, the above operations are carried out in block 6.

The stator current can be reconstructed from the estimated current and the current error, i.e.

$$i_{s,dc} = \hat{i}_s + \tilde{i}_s. \tag{7}$$

Instead of the estimated current, this reconstructed current can be used as feedback in the integral part of the current controller 10. Hence, the steady-state error in the current control caused by parameter errors can be avoided.

3 Observer 3.1 Adaptive Observer

An adaptive observer [12] 8 is used for estimating the stator current, rotor speed, and rotor position. The speed and position estimation is based on an estimation error between two different models; the actual motor can be considered as a reference model and the observer—including the rotor speed estimate $\hat{\omega}_m$—as an adjustable model. An error term used in an adaptation mechanism is based on the estimation error of the stator current. The estimated rotor speed, obtained by the adaptation mechanism, is fed back to the adjustable model.

Figure 5:
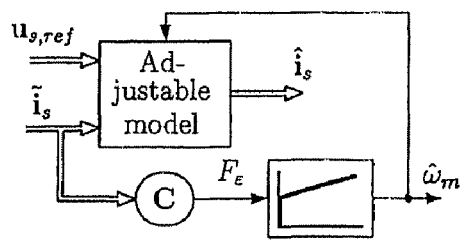
FIG. 5 shows a block diagram of an adaptive observer.

The adaptive observer 8 is formulated in the estimated rotor reference frame. A block diagram of the adaptive observer is shown in FIG. 5. The adjustable model is based on a dynamic model of the motor, a stator flux being the state variable. The model is defined by $$\dot{\hat{\psi}}_s = u_{s,ref} - R_s\hat{i}_s - \hat{\omega}_m J\hat{\psi}_s + \lambda\tilde{i}_s \tag{8}$$

where estimated quantities are marked by $\hat{\ }$, $u_{s,ref}$ is the stator voltage reference, and $R_s$ the stator resistance estimate. The estimate of the stator current is $$\hat{i}_s = L^{-1}(\hat{\psi}_s - \psi_{pm}) \tag{9}$$

where $$L = \begin{bmatrix} L_d & 0 \\ 0 & L_q \end{bmatrix}$$

is the estimated stator inductance matrix, $L_d$ and $L_q$ being the estimates of the direct- and quadrature-axis inductances, respectively, and $\omega_{pm}=[\psi_{pm}\ 0]^T$ is the estimated permanent magnet flux. The current error is calculated based on available current samples as described above. The feedback gain matrix $\lambda$ is varied as a function of the rotor speed as explained in [12].

The adaptation is based on an error term $$F_\epsilon = C\tilde{i}_s \tag{10}$$

where $C=[0\ L_q]$. Hence, the current error in the estimated q direction is used for adaptation. An estimate of the electrical angular speed of the rotor is obtained by a PI speed adaptation mechanism $$\hat{\omega}_m = -k_p F_\epsilon - k_i \int F_\epsilon dt \qquad (11)$$

where $k_p$ and $k_i$ are non-negative gains. The estimate $\hat{\theta}_m$ for the rotor position is obtained by integrating $\hat{\omega}_m$.

3.2 High-Frequency Signal Injection

Since the adaptive observer cannot perform well at low speeds due to inaccuracies in measurements and parameter estimates, an HF signal injection method is used to stabilize the observer. In the signal injection presented in [13], a carrier excitation signal alternating at angular frequency $\omega_c$ and having an amplitude $u_c$, i.e.

$$U_{c1} = u_c \begin{bmatrix} \cos(\omega_c t) \\ 0 \end{bmatrix} \qquad (12)$$

is superimposed on the voltage reference in the estimated rotor reference frame. An alternating current response is detected on the q axis of the estimated rotor reference frame, amplitude modulated by the rotor position estimation error $\tilde{\theta}_m = \theta_m - \hat{\theta}_m$. Demodulation and low-pass filtering results in an error signal $\epsilon$ that is approximately proportional to $\tilde{\theta}_m$.

At low speeds, the HF excitation voltage in (12) can result in a stator voltage reference that alternates only in few sectors. As a result, one of the stator phase currents can be unavailable for a long period. In such a case, the signal injection cannot detect the rotor position reliably. For better sector coverage, a modified HF excitation voltage $$U_{c2} = u_c \begin{bmatrix} \cos(\omega_c t) \\ \sin(p\omega_c t) \end{bmatrix} \qquad (13)$$

is used according to the method of the invention. In equation (13), p is a multiplier of the frequency injected to the d axis. According to the method of the invention, the voltages injected to the d and q axes have a different frequency, and the multiplier p can thus have any value other than 1. Thus, if p equals 2, the second harmonic of the excitation frequency is injected to the q axis of the estimated rotor reference frame. Although this results in the second harmonic also in the stator current, the error signal $\epsilon$ is not affected since the demodulation is only sensitive to frequencies at $\omega_c$. According to a preferred embodiment of the invention, the frequency of the voltage injected to the q axis has a higher frequency than the frequency of the injected d component. This is preferred, since the lower the injected q component, the more it can disturb the current controller.

The injection is carried out in the block diagram of FIG. 1, block 11, which produces the voltage signal $u_c$ that is added to the output of the current controller 10. The sum of the high frequency voltage signal and the output of the current controller is the stator voltage reference $u_{s,ref}$ that is fed to the observer 8 and to PWM block 5 via co-ordinate transformation block 7.

Figure 2:
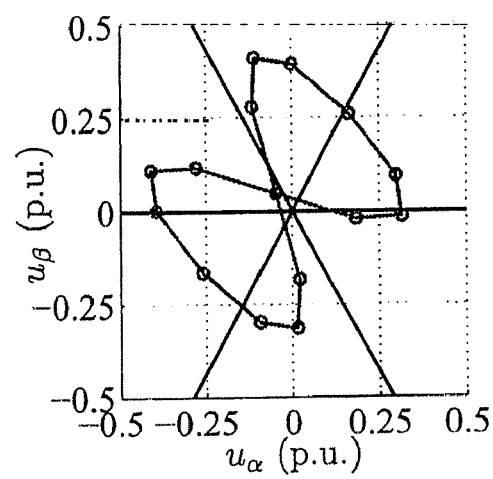
FIG. 2 shows an example of a stator voltage reference with a modified injected signal.

FIG. 2 shows an example of a stator voltage reference vector $u_{s,ref}$ in the stationary reference frame during one signal injection period. In FIG. 2, the signal injection according to the method of the invention is used and the voltage offset is due to the constant voltage corresponding to the full-load operation at standstill. Discrete voltage samples are shown as circles and also the sector borders are shown. In FIG. 2, the high frequency voltage amplitude $u_c$ is 0.3 p.u. and one signal injection period has 16 sampling periods, thus the sampling frequency is 16 times higher than the frequency of the HF signal. The amplitude of the injected voltage is selected such that it ensures movement of the voltage reference between different sectors and produces a current that can be detected despite voltage losses in the stator. The rotor position in FIG. 2 is 45 electrical degrees and the multiplier p in (13) has a value of 2, i.e. the second harmonic of the excitation frequency is injected to the q axis. If the known signal injection were used, FIG. 2 would show a voltage that oscillates only in one direction above and below the offset voltage forming a straight line.

Signal injection block 11 also calculates the error signal $\epsilon$ from the reconstructed stator current $i_{s,dc}$, which is the sum of the current error $\tilde{i}_s$ and the estimated stator current $\hat{i}_s$. The error signal $\epsilon$ is fed to the adaptive observer 8.

The error signal $\epsilon$ is used for correcting the estimated position by influencing the direction of the stator flux estimate of the adjustable model. The algorithm is given by $$\hat{\dot{\psi}}_s = u_{s,ref} - R_s \hat{i}_s - (\hat{\omega}_m - \omega_\epsilon) J \hat{\psi}_s + \lambda \tilde{i}_s \qquad (14)$$

and $$\omega_\epsilon = \gamma_p \epsilon + \gamma_i \int \epsilon dt \qquad (15)$$

where $\gamma_p$ and $\gamma_i$ are the gains of the PI mechanism driving the error signal $\epsilon$ to zero.

In a preferred embodiment of the invention, both the signal injection method and the adaptive observer contribute to the rotor speed and position estimation at low speeds only. Preferably, the influence of the HF signal injection is decreased linearly with increasing speed, reaching zero at a certain speed. At higher speeds, the estimation is based only on the adaptive observer. The limit at which the influence of signal injection is removed is, for example, 0.13 p.u. The signal injection can be removed by decreasing the amplitude of the injected signal and gain $\gamma_i$. The HF injected signal according to the invention ensures that enough samples are obtained from the HF current to obtain the required information. The frequency of the injected HF signal is, for example, 500 Hz in the direction of d axis.

It is noted that the HF excitation voltage in equation (13) is included in the voltage reference fed to the adjustable model in equation (8). This ensures reliable prediction of the HF component in the stator current estimate $\hat{i}_s$, which is needed for calculating the current error. It is also to be noted that instead of the estimated current $\hat{i}_s$, the reconstructed stator current $i_{s,dc}$ has to be used for demodulation in the signal injection method.

In the above description, the method of the invention is described in connection with only one possible control system. It is, however, clear that the method of the invention can also be utilized in connection with other types or control systems. It will be obvious to a person skilled in the art that as technology advances, the inventive concept can be implemented in various ways. The invention and its embodiments are not limited to the examples described above but may vary within the scope of the claims.

The invention claimed is:

1. A method for sensorless estimation of rotor speed and position of a permanent magnet synchronous machine, when the permanent magnet synchronous machine is fed with a frequency converter, the method comprising the steps of
    forming a stator voltage reference for the permanent magnet synchronous machine, injecting a high frequency signal ($u_c$) into the stator voltage reference, measuring a DC-link current ($i_{dc}$) of the frequency converter when the permanent magnet synchronous machine (4) is fed with a voltage ($u_{s,ref}$) corresponding to a sum of the stator voltage reference and the injected signal, calculating a stator current estimate ($\hat{i}_s$), calculating a current error ($\tilde{i}_s$) as a difference between the stator current estimate and the measured DC-link current, and estimating a rotor speed ($\hat{\omega}_m$) and position ($\hat{\theta}_m$) of the permanent magnet synchronous machine based on the current error, wherein the injected high frequency signal ($u_c$) comprises a direct axis component and a quadrature axis component, the direct axis component having a first frequency and the quadrature axis component having a second frequency, the first and second frequencies being different.

2. A method according to claim 1, wherein the stator current estimate ($\hat{i}_s$) is calculated using an adaptive observer.

3. A method according to claim 2, wherein the adaptive observer receives the sum of the stator voltage reference and the injected voltage signal ($u_{s,ref}$) and an error signal ($\epsilon$) which relates to an angle estimation error originating from the injected voltage and which is obtainable from a stator current, and which error signal is demodulated from the sum of the current error ($\tilde{i}_s$) and the stator current estimate ($\hat{i}_s$).

4. A method according to claim 2, wherein the second frequency is higher than the first frequency.

5. A method according to claim 1, wherein the second frequency is higher than the first frequency.

6. A method according to claim 5, wherein the adaptive observer receives the sum of the stator voltage reference and the injected voltage signal ($u_{s,ref}$) and an error signal ($\epsilon$) which relates to an angle estimation error originating from the injected voltage and which is obtainable from a stator current, and which error signal is demodulated from the sum of the current error ($\tilde{i}_s$) and the stator current estimate ($\hat{i}_s$).

* * * * *